(12) United States Patent
Piekarz

(10) Patent No.: US 7,456,777 B2
(45) Date of Patent: Nov. 25, 2008

(54) REMOTE CONTROL MEANS

(75) Inventor: Roman Piekarz, Mielec (PL)

(73) Assignee: Bury Sp.z.o.o., Mielec (PL)

( * ) Notice: Subject to any disclaimer, the term of this patent is extended or adjusted under 35 U.S.C. 154(b) by 441 days.

(21) Appl. No.: 11/399,596

(22) Filed: Apr. 7, 2006

(65) Prior Publication Data
US 2007/0100509 A1 May 3, 2007

(30) Foreign Application Priority Data
Apr. 7, 2005 (DE) .................. 10 2005 016 147

(51) Int. Cl.
G08C 19/12 (2006.01)

(52) U.S. Cl. .................. 341/176; 224/577; 224/578; 361/680; 361/681

(58) Field of Classification Search .................. 341/173, 341/176, 20; 361/680, 681; 224/577, 578
See application file for complete search history.

(56) References Cited

U.S. PATENT DOCUMENTS

| 6,569,424 B2* | 5/2003 | Olshenitsky et al. ....... 424/93.3 |
| 6,729,518 B2* | 5/2004 | Badillo et al. ................ 224/578 |
| 6,816,151 B2* | 11/2004 | Dellinger .................... 345/167 |
| 7,270,255 B2* | 9/2007 | Badillo et al. ................ 224/577 |
| 2004/0051392 A1 | 3/2004 | Badarneh |

FOREIGN PATENT DOCUMENTS

| DE | 195 39 396 | 5/1996 |
| DE | 196 25 966 | 1/1998 |
| DE | 299 10 846 | 9/1999 |
| DE | 101 00 214 | 7/2001 |
| DE | 103 25 960 | 12/2004 |
| EP | 1 162 113 | 12/2001 |
| EP | 1 514 721 | 3/2005 |
| JP | 2002-019552 | 1/2002 |

* cited by examiner

Primary Examiner—Albert K Wong
(74) Attorney, Agent, or Firm—Whitham, Curtis, Christofferson & Cook, PC

(57) ABSTRACT

A remote control for electronic devices in motor vehicles, having a holding part with attachment elements for mounting the holding part on a steering wheel in a releasable manner, having operator control keys on a housing of the remote control means, and having a unit for transmitting control signals, which are triggered by operating the operator control keys, to the at least one electronic device, has at least one operator control key which is arranged on the rear face of the housing of the remote control, which rear face points away from the driver when the remote control is mounted on the steering wheel, in such a way that a driver can use his fingertips to operate the operator control key when gripping the steering wheel.

10 Claims, 2 Drawing Sheets

REMOTE CONTROL MEANS

BACKGROUND OF THE INVENTION

1. Field of the Invention

The invention relates to a remote control means for electronic devices in motor vehicles, having a holding means with attachment elements for mounting the holding means on a steering wheel in a releasable manner, having operator control keys on a housing of the remote control means, and having a unit for transmitting control signals, which are triggered by operating the operator control keys, to the at least one electronic device.

Remote control means of this type which are to be retrofitted to a steering wheel are known particularly for operating hands-free systems, navigation systems, car radios, etc. Arranging the remote control means on the steering wheel means it is possible to operate these electronic devices without the driver having to take his hands off the steering wheel. This leads to increased traffic safety.

2. Description of the Related Art

In conventional remote control means which are to be mounted on the steering wheel, all operator control keys are arranged on the front face of the housing of the remote control means, which front face is directed toward the driver. The advantage of this is that the position of the operator control keys and their meaning can be seen. However, the options provided by conventional remote control means are limited by the space available in the housing of the remote control means and the frontal position.

The object of the invention is therefore to provide an improved remote control means which is even easier to operate and may be equipped with additional operator control keys if desired.

According to the invention, the object is achieved by the remote control means of this generic type in that at least one operator control key is arranged on the rear face of the housing of the remote control means, which rear face points away from the driver when the remote control means is mounted on the steering wheel, in such a way that a driver can use his fingertips to operate said operator control key when gripping the steering wheel when the remote control means is mounted on the steering wheel.

First of all, this new position of operator control keys on the rear face of the housing of the remote control means has the disadvantage that this operator control key cannot be seen by the driver. However, the operator control keys on the rear face of the housing of the remote control means can be operated in an ergonomically favorable fashion and space in the housing of the remote control means which has not previously been used can be utilized for optional additional operator control keys on the rear face of the housing of the remote control means. These advantages fully compensate for the disadvantage of not being able to see the operator control keys since a proficient driver will quickly become familiar with the new operator control keys on the rear face of the remote control means.

It is particularly advantageous when further operator control keys are arranged on the front face of the housing of the remote control means in a known manner.

It is also advantageous when the housing of the remote control means has locking elements for clamping the housing of the remote control means to the holding means in a releasable manner. This two-part design of the remote control means that the holding means can remain on the steering wheel and only the housing of the remote control means need be replaced as required. This means that operator control is also possible when said housing of the remote control means is detached from the holding means, for example by a passenger.

It is also advantageous when the operator keys on the front face comprise a 10-digit numerical keypad plus special characters. This numerical keypad which is extended in comparison to the previously customary operator control key arrangements has the advantage of simple operator control, for example of telephones.

In order to facilitate orientation of the user, a tactile marker can be provided on the surface of at least one operator control key.

The transmission unit is preferably designed to transmit radio data and optionally optical data, in particular with an infrared transmitter, or acoustic data, in particular with ultrasound.

The at least one electronic device has a corresponding transmission unit for receiving the control signals transmitted by the transmission unit of the remote control means.

It is also advantageous when at least one operator control key is in the form of a rotary regulator and/or a switch. The rotary regulator can be used for smooth control, for example of the volume.

BRIEF DESCRIPTION OF THE DRAWINGS

The invention is explained by way of example in greater detail below with reference to the attached drawing, in which.

DETAILED DESCRIPTION OF THE PREFERRED EMBODIMENT

Figure 1:
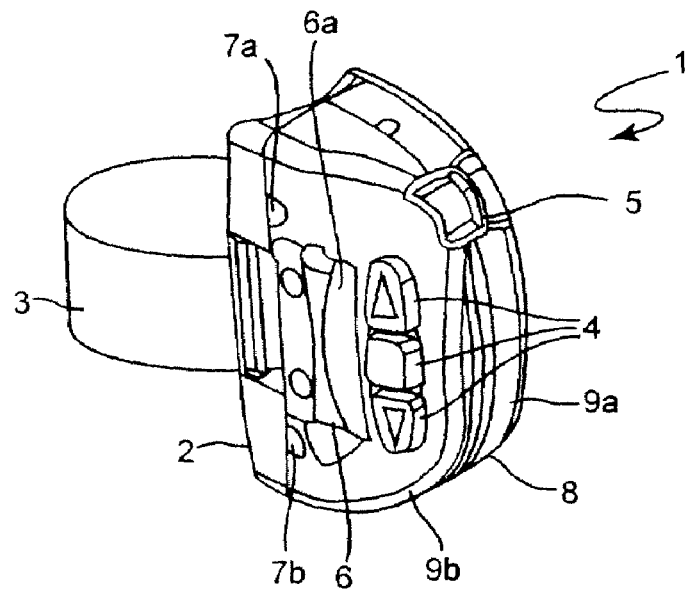
FIG. 1—shows a view of the rear of the radio remote control means from the side.

FIG. 1 shows a view of the rear of a remote control means 1 from the side, it being possible to attach said remote control means to a holder 2 on the steering wheel of a vehicle. To this end, a belt 3 is provided which is passed around the steering wheel rim and attached to the side of the holding means 2. The connection between the remote control means 1 and the steering wheel is reinforced by an additional adhesive pad on the bearing area of the holding means 2 in relation to the steering wheel rim in order to prevent the remote control means 1 from slipping or twisting.

It can be seen that operator control keys 4 are arranged on the rear face of the remote control means 1 in such a way that the driver can comfortably reach said operator control keys with his fingertips when gripping the steering wheel. The operator control keys 4 can be used, for example by operating the upwardly and downwardly directed arrow keys, to scroll up or down through an operator control menu which is provided by the electronic device which is actuated by the remote control means 1. The middle arrow key has, for example, a so-called "Enter" function with which an entry is confirmed and an action is triggered. Intuitive operation of the electronic device, for example browsing through a menu, is possible with these operator control keys 4 in the form of rocker keys.

It can also be seen that a rotary rocker or a rotary regulator 5, for example for adjusting the volume, is provided on the upper outer edge of the remote control means 1. However, a rotary regulator of this type may also be used to browse through a menu or the like.

A battery compartment 6 is also provided on the rear face of the remote control means 1, with a battery for supplying power to the remote control means 1 being inserted into said battery compartment and the latter being closed by a battery compartment cover 6a.

Locking lugs 7a, 7b are also provided on the holding means 2 in order to clamp the housing 8 of the remote control means to the holding means 2 in a releasable manner. The housing 8 of the remote control means is formed in two parts with an upper and a lower shell 9a, 9b, the upper shell 9a and the lower shell 9b being clipped, welded, adhesively bonded and/or screwed to one another after the electronics, the operator control keys 4 and other elements are installed in the housing 8 of the remote control means.

Figure 2:
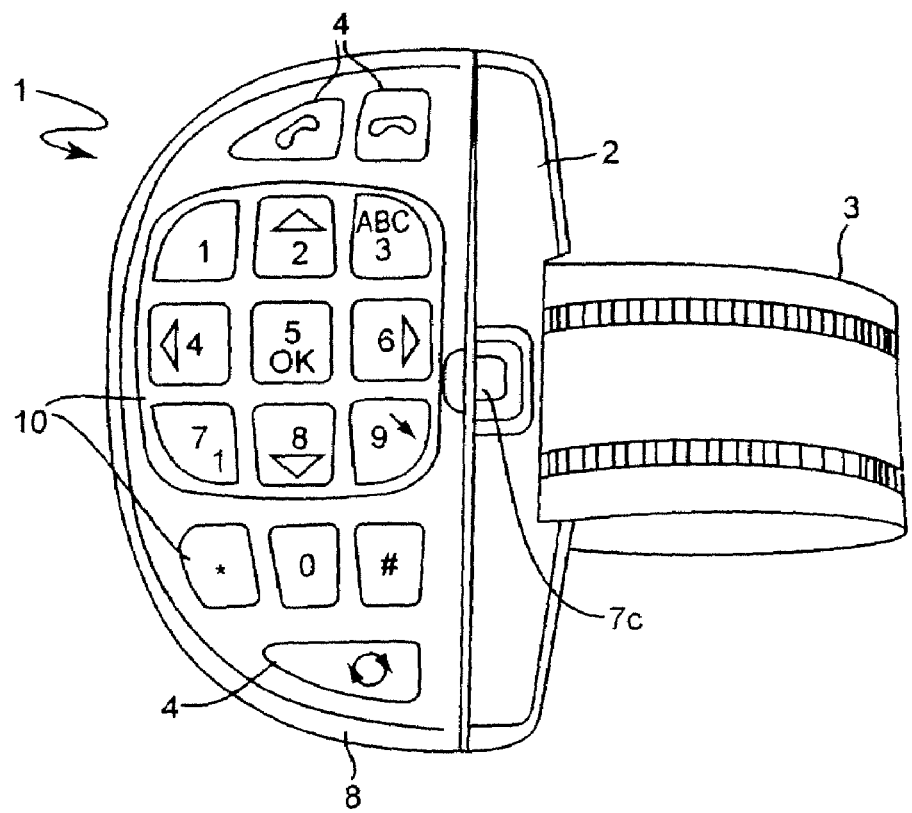
FIG. 2—shows a view of the front of the radio remote control means from FIG. 1.

FIG. 2 shows a view of the front of the remote control means 1. It is evident that further locking elements 7c with a spring snap-action hook are provided on the holder 2 and the housing 8 of the remote control means in order to clamp the housing 8 of the remote control means to the holding means 2 and to release it from the holder 2 again after operation of the spring snap-action hook 7c.

It can also be seen that a keypad 10 with ten numbers and the two special characters "Star" and "Pound" are provided on the front face of the housing 8 of the remote control means. This 12-digit block keypad provides the option of entering numbers, for example for dialing telephone numbers, in addition to customary navigation and operating keys.

Furthermore, two operator control keys 4 for accepting and rejecting a call are provided in the upper region, and one operator control key 4 for switching over the numerical block keypad to a secondary keypad assignment is provided in the lower region.

Figure 3:
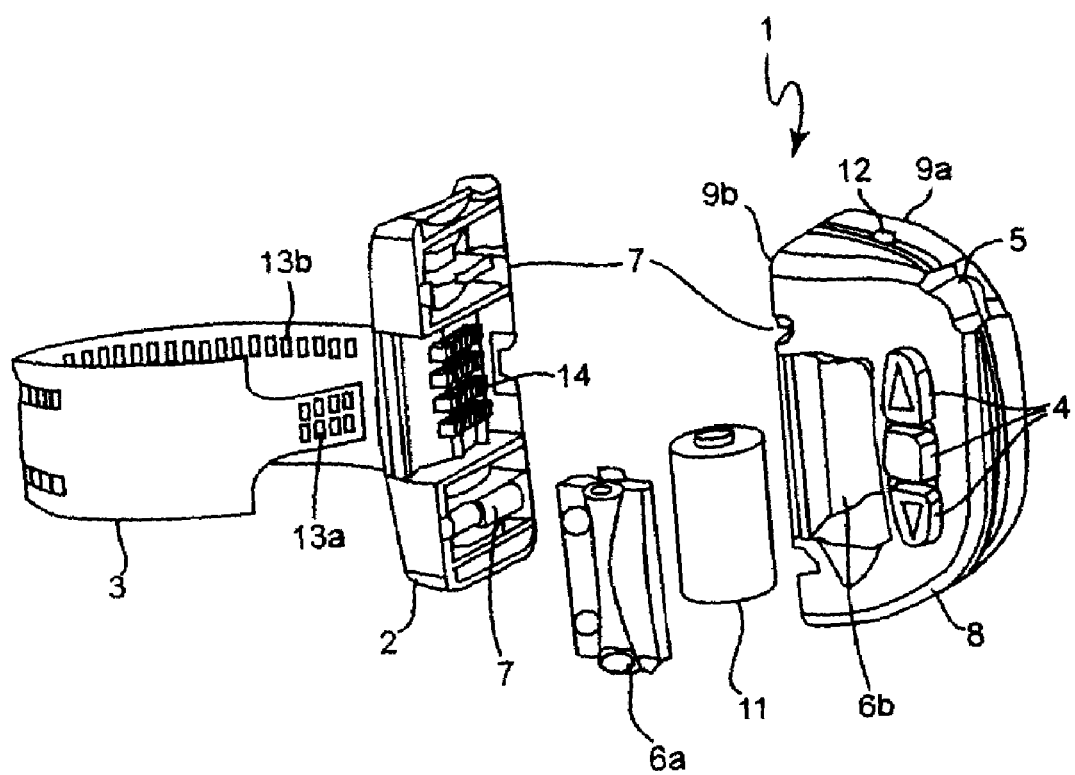
FIG. 3—shows an exploded view of the rear of the remote control means from FIGS. 1 and 2.

FIG. 3 shows an exploded view of the remote control means 1. The ergonomically favorable arrangement of the operator control keys 4 on the rear face of the housing 8 of the remote control means is again evident. It can also be seen that a battery 11 is inserted into the battery compartment 6b, which is closed by a battery compartment cover 6a, in order to supply power to the remote control means 1.

The remote control means 1 has a transmission unit (not illustrated) for transmitting control signals, which are triggered by operation of the operator control keys 4, as radio data. The transmission unit may be designed for optical data transmission, in particular with an infrared transmitter, or acoustic data transmission, in particular with ultrasound. However, it is particularly advantageous when the transmission unit is designed to transmit radio data with a radio transmitter in order to control the electronic device, for example a hands-free apparatus or a navigation system. This radio data transmission has the advantage that a connection between the remote control means 1 and the electronic device is also guaranteed when the radio remote control means 1 or the electronic device is covered by other objects or is influenced during operation by the driver's fingers.

Provision is optionally made for the remote control means 1 to have an illumination unit with lighting elements in order to ensure precise operator control, which is safe for the driver, of the electronic device using the remote control means even when it is dark. In this case, the illumination unit is designed such that it activates illumination means as a function of operation of the operating keys. Said illumination means is deactivated after a short period of time by a built-in timer, it being possible for the switch-off time to be set individually or to be prespecified in the remote control means 1 as a standard value. This allows the remote control means 1, which is only supplied with power by a battery 11, to save energy. The illumination means of the remote control means 1 is only switched on when any operator control key 4 is operated. Since illuminating the remote control means 1 throughout the day when it is bright would be a waste of energy, a light sensor 12 is integrated in the remote control means 1 in order to switch on the illumination means only when it is not bright enough. If the light sensor 12 has detected that it is not bright enough, the first instance of operation of any operator control key 4 can then be ignored and only used as signal to switch on the illumination means of the remote control means 1, so that no control signal is transmitted to the electronic device when any operating key 4 is first operated.

FIG. 3 also shows the holding means 2 and the belt 3 in detail. It is evident that three holes 13a, 13b are provided in the belt and can be placed over pins 14 in the interior of the holding means 2 in order to attach the belt 3 to the steering wheel in a variable manner in accordance with the diameter of the steering wheel rim. As soon as the belt 3 has been tightened and secured on the steering wheel, the housing 8 of the remote control means is pushed onto the holding means 2 and attached using the resilient locking elements 7.

The invention claimed is:

1. A remote control means for electronic devices in motor vehicles, having a holding means with attachment elements for mounting the holding means on a steering wheel in a releasable manner and which prevents slipping or twisting on said steering wheel, having operator control keys arranged on at least two surfaces of a housing of the remote control means, and having a unit for transmitting control signals, which are triggered by operating the operator control keys, to the at least one electronic device, and further having at least one operator control key is arranged on the rear face of the housing of the remote control means, which rear face points away from the driver when the remote control means is mounted on the steering wheel, in such a way that a driver can use his fingertips to operate said operator control key when gripping the steering wheel when the remote control means is mounted on the steering wheel, wherein further operator control keys are arranged on the front face of the housing of the remote control means.

2. The remote control means as claimed in claim 1, wherein the housing of the remote control means has locking elements for clamping the housing of the remote control means to the holding means in a releasable manner.

3. The remote control means as claimed in claim 1, wherein operator control keys on the front face comprise a 10-digit numerical keypad plus special characters.

4. The remote control means as claimed in claim 1, wherein the transmission unit is designed to transmit radio data, optical data, in particular with an infrared transmitter, or acoustic data, in particular with ultrasound.

5. The remote control means as claimed in claim 1, wherein at least one operator control key is in the form of a rotary rocker or rotary regulator.

6. The remote control means as claimed in claim 1, wherein at least one operator control key is in the form of a switch.

7. The remote control means as claimed in claim 1, wherein at least one operator control key has a tactile marker on one surface.

8. The remote control means as claimed in claim 1, distinguished by an illumination unit in the remote control means.

9. The remote control means as claimed in claim 8, wherein the illumination unit can be activated as a function of operation of the operator control keys.

10. The remote control means as claimed in claim 8, distinguished by a light sensor, which is connected to the illumination unit, in the housing of the remote control means for activating the illumination means when a defined brightness limit is not reached, with the illumination unit being designed to switch on the illumination means after any operator control key is operated and a brightness limit is not reached.

* * * * *